US008904704B1

(12) United States Patent
Madigan et al.

(10) Patent No.: US 8,904,704 B1
(45) Date of Patent: Dec. 9, 2014

(54) SEEDING TREATMENTS

(75) Inventors: Daniel Paul Madigan, Green Bay, WI (US); Michael Dennis Krysiak, Green Bay, WI (US); Ronald Dean Eichhorn, Green Bay, WI (US); Glen H. Wesenberg, Green Bay, WI (US)

(73) Assignee: Encap, LLC., Green Bay, WI (US)

(*) Notice: Subject to any disclaimer, the term of this patent is extended or adjusted under 35 U.S.C. 154(b) by 0 days.

(21) Appl. No.: 09/710,309

(22) Filed: Nov. 10, 2000

Related U.S. Application Data

(62) Division of application No. 09/113,254, filed on Jul. 10, 1998.

(60) Provisional application No. 60/052,287, filed on Jul. 11, 1997.

(51) Int. Cl.
*A01C 1/06* (2006.01)

(52) U.S. Cl.
USPC .......................................................... 47/57.6

(58) Field of Classification Search
CPC ...................................................... A01C 1/06
USPC .............. 47/57.6, 58.1 R, 58.1 SE; 504/100; 71/64.02, 64.05; 118/304, 308, 417, 118/418
See application file for complete search history.

(56) References Cited

U.S. PATENT DOCUMENTS

| | | | | |
|---|---|---|---|---|
| 2,360,460 A * | 10/1944 | Williams | ...................... | 118/418 |
| 2,502,809 A * | 4/1950 | Vogelsang | .................... | 504/100 |
| 2,579,734 A * | 12/1951 | Burgesser | ..................... | 47/57.6 |
| 2,651,883 A * | 9/1953 | Hedrick et al. | ................ | 47/57.6 |
| 2,707,935 A * | 5/1955 | Barber | .......................... | 118/417 |
| 2,736,139 A * | 2/1956 | Wise | ........................... | 47/58.1 R |
| 2,967,376 A * | 1/1961 | Scott, Jr. | ....................... | 504/100 |
| 3,224,867 A * | 12/1965 | Milloch | ........................... | 71/27 |
| 3,422,569 A * | 1/1969 | Lyon | ............................. | 504/100 |
| 3,545,129 A * | 12/1970 | Schreiber et al. | ............. | 504/100 |
| 3,687,640 A * | 8/1972 | Sams et al. | | |
| 3,698,133 A | 10/1972 | Schreiber | | |
| 3,936,976 A * | 2/1976 | Porter et al. | ................... | 47/57.6 |
| 4,065,287 A | 12/1977 | Roth | | |
| 4,249,343 A * | 2/1981 | Dannelly | ....................... | 47/57.6 |

(Continued)

FOREIGN PATENT DOCUMENTS

CA 2173260 A * 10/1997
DE 3442317 A1 * 5/1986

(Continued)

OTHER PUBLICATIONS

Anonymous, Examiner's Document A, 1997, John Wiley & Sons, Inc. pp. 198, 205, and 206.*

(Continued)

*Primary Examiner* — Shadi Baniani
*Assistant Examiner* — Danielle Clerkley
(74) *Attorney, Agent, or Firm* — Philip M. Weiss; Weiss & Weiss

(57) ABSTRACT

This present invention relates to improvements in seed and seed-related products, processes for making such products and processes for establishing and improving seed beds and seed bed germination. As additional benefits, this invention is directed at improving soil productivity through enhancements in soil fertility, soil condition/tilth, and control of soil moisture. Further, the invention relates to productive use of certain types of abundantly available manufacturing waste, which waste is currently being disposed of in landfills.

11 Claims, 6 Drawing Sheets

(56) References Cited

U.S. PATENT DOCUMENTS

| | | | |
|---|---|---|---|
| 4,250,660 A * | 2/1981 | Kitamura et al. | 47/57.6 |
| 4,448,796 A * | 5/1984 | Wieser et al. | 427/4 |
| 4,465,017 A * | 8/1984 | Simmons | 118/418 |
| 4,514,425 A * | 4/1985 | Rebhan | 426/93 |
| 5,019,564 A | 5/1991 | Lowe et al. | |
| 5,044,116 A * | 9/1991 | Gago et al. | 47/57.6 |
| 5,174,804 A * | 12/1992 | Rehberg et al. | 71/3 |
| 5,242,690 A * | 9/1993 | Moechnig | 424/405 |
| 5,380,350 A * | 1/1995 | Fersch | 71/64.03 |
| 5,525,131 A * | 6/1996 | Asano | 47/57.6 |
| 6,156,699 A * | 12/2000 | Johnson et al. | 504/100 |
| 6,209,259 B1 * | 4/2001 | Madigan et al. | 47/57.6 |
| 2002/0095864 A1 * | 7/2002 | Obert et al. | 47/57.6 |

FOREIGN PATENT DOCUMENTS

| | | | |
|---|---|---|---|
| DE | 4220931 A1 * | 1/1994 | |
| EP | 0010630 A1 * | 5/1980 | |
| GB | 670461 | 4/1952 | |
| GB | 1380865 A * | 1/1975 | |
| WO | WO85/01736 | 4/1985 | |

OTHER PUBLICATIONS

Anonymous, Seed Treatment Category 4, 1999 (revised), p. 18.*

J. Stier and D. Tetrault, "Effect of Encapsulated Seed on Turfgrass Establishment," Wisc. Turf Res. 1999, pp. 151-156.

Encapsulated Seed Technology [online], Encap, LLC 2009 [retrieved on Aug. 8, 2011]. Retrieved from the Internet <URL:http://corporate.encap.net/Technologies/tabid/73/EncapsulatedSeedTechnology-EST.aspx>.

This application is related to pending reexamination control No. 90/012,183.

IPR 2013-0110—List of document paper and exhibits and Final Written Decision.

* cited by examiner

SEEDING TREATMENTS

RELATED APPLICATIONS

This is a divisional application of U.S. patent application Ser. No. 09/113,254 filed Jul. 10, 1998 which claims benefit to U.S. provisional No. 60/052,287 filed Jul. 11, 1997.

FIELD OF THE INVENTION

This present invention relates to improvements in seed and seed-related products, processes for making such products and processes for establishing and improving seed beds and seed bed germination. As additional benefits, this invention is directed at improving soil productivity through enhancements in soil fertility, soil condition/tilth, and control of soil moisture. Further, the invention relates to productive use of certain types of abundantly available manufacturing waste, which waste is currently being disposed of in landfills.

BACKGROUND OF THE INVENTION

Agricultural growers, gardeners, landscape operators, flower growers, and the like produce a wide variety of cultivated crops. Many such crops are grown from seed. The sizes, shapes, and physical characteristics of the various kinds of seeds are as varied as the number of crops produced therefrom.

Producers of such cultivated crops encounter a variety of challenges in handling and distributing such seed, as well as with sowing of such seed in suitable growing media. Certain seed may desirably be sowed by a broadcast method if the seed were compatible with broadcast application. For example, grass seed for lawns is desirably broadcast, but the low density and generally non-aerodynamic shape of some grass seed can limit the range of such broadcast, and make such seed susceptible to being blown about by wind, or washed away by surface water, even if initially well placed in a good seeding application.

Another difficulty encountered in sowing seed is that the seed may be so small as to be difficult to handle, thereby to place properly-spaced seeds at a desired spacing as to make cost-effective use of the seed, thereby to produce a crop of the related plants without using any more seed than necessary, thus to gain maximum benefit from the amount of seed used.

While small seed may be efficiently handled by industrial equipment especially designed for handling such seed, typically the user of such seed also handles various other types of seed; and may be unable to justify the cost of such specialty seed-handling equipment. Rather, the seed user typically has a limited range of seed handling equipment which must be capable of being used and/or adapted to handle and apply all the types of seeds being used by that user. Where the seed itself can be adapted to the equipment, specialty seed can be handled without need for any specialized equipment.

Even where the seed may be sown by hand, such as in seedling or bedding trays or pots, some seeds are so small as to be difficult for the sower/user to effectively manipulate and control by hand. Typical of such difficult-to-handle seeds are seeds of lettuce, carrots, the cabbage family, ground cherries, and alfalfa. Many flower seeds are equally small and/or difficult to handle and/or manipulate, for example poppy seed.

When seed is planted, the seed has immediate use for moisture to aid in germination of the seed, and subsequent early development of the resulting young plant. Where moisture is not readily available to the seed when planted, the seed may lie in a dormant state for some period of time before germinating. While the seed is thus dormant, awaiting suitable moisture, the seed is subject to a variety of hazards which may destroy its viability. The seed may be attacked by worms, parasites, and other pests. The seed may be eaten by foraging animals including insects and larvae. The seed may be overheated by a hot sun. The seed may lie dormant without germinating for so long that any plant emerging therefrom will have insufficient time to mature before the end of the growing season.

If and when the seed does germinate, the seedling plant has a continuing need for a proper balance of moisture and oxygen, as well as for such plant nutrients as nitrogen, phosphorous and potash, as well as the micronutrients, in relatively predictable quantities. To the extent the proper balance of such materials is available to the young plant, a healthy young plant may be produced, with optimum potential for maximum crop production, assuming germination occurs at a seasonably-desirable time.

To the extent one or more such materials is not available to the seed and/or the young plant, plant growth, plant health, and ultimately maturity, may be adversely affected. For example, the soil may be too dry to support germination, or optimum germination. Or while the soil may in general have a desired moisture content, moisture content at a macro level can vary widely. Thus, while the soil in general may have a desirable moisture content, the microcosm of the soil adjacent an individual seed may be too dry, or too wet, to support any germination, or optimum germination.

Similarly, the soil may be generally depleted of one or more plant nutrients needed by the germinated seedling. Or while the soil may in general have desired nutrient levels, the nutrient levels at a macro level can vary widely. Thus, the microcosm of the soil adjacent an individual seed may be too low in one or more nutrients to support a desired level of plant growth, or, so high as to be toxic to a desired level of plant growth.

Further, plant nutrient chemicals may be present in the soil, but so tied up chemically in the soil as to be unavailable, or poorly available, relative to the quantities and use rates needed for desired plant growth. Or the soil may become so hard, dry, and/or caked shortly after the seed germinates that the seedling plant has difficulty penetrating such soil, difficulty becoming associated suitable nutrients, and/or difficulty taking up such nutrients because of insufficient moisture availability.

After the plant has further developed such that the plant roots extend deeper into the soil, conditions of the soil near the surface are less critical. However, until such time as the roots so penetrate, conditions of the soil at and near the top surface of the soil may be critical.

Soil fertility generally relates to uptake of plant nutrients from the soil by plants. Uptake is generally the result of two factors, the presence of plant nutrients in the soil, and the availability of the plant nutrients for plant uptake. Presence of plant nutrients in the soil is generally a function of the combination of (a) the basic level of soil fertility, (b) depletion by previous crop production and (c) replenishment with fertilizer. Availability of a plant nutrient physically present in the soil for plant uptake is in general related to solubility of the respective nutrient or nutrient combination in a solvent for the nutrient, which solvent is present in the soil, such solvent as water, along with any other material affecting solvation of the plant nutrient into the water or other solvent.

Plant nutrients are routinely depleted from the soil by crop production, and are routinely added back, or otherwise replenished, to the soil by conventional inorganic fertilizers.

In order for plant nutrients in the soil to be available for uptake by plants, the nutrients must be held in the soil without excessive leaching, but must not be held so tightly that the nutrients cannot be released for plant uptake. Thus nutrient availability requires a balance between holding tightly enough to retain the nutrient in the root zone, without leaching, but not so tight as to make the nutrient unavailable for plant uptake. Thus, the general "condition" or "tilth" of the soil is instrumental in determining the efficiency with which plant nutrients are utilized for plant nutrition.

A properly conditioned soil has advantageous soil chemistry in combination with advantageous soil texture. Thus, in addition to providing specific plant nutrients, soil users also use products that modify basic soil chemistry, and soil texture.

Basic soil chemistry is modified by adding to the soil, for example, calcium products to provide pH control, and flyash or like products to provide pH control as well as micronutrients.

Soil texture is generally modified by adding to the soil organic matter such as manures, sludges, wood and other plant products and by-products, and the like. While such materials have good soil conditioning properties, plant nutrient value of such materials is fixed and is generally so low that other "fertilizer"-type products must in general be used in addition to the organic matter in order to preserve plant nutrient values in the soil.

The primary object of this invention is to provide solid plant seed capsule products that supply both soil conditioning properties and the seed, which can benefit from such conditioned soil, in a given seed capsule particle.

It is a further object to provide a plant nutrient material, in the seed capsule particle, in amount beneficial to the seedling emerging from the seed, and higher than a naturally-occurring amount of such nutrient in such soil conditioning material, so as to have enhanced chemical nutrient qualities over use of the soil conditioning material alone.

In another aspect, a further object is to provide soil conditioning and optionally nutrient qualities to seed products that reach the soil as the result of fulfilling objectives separate from providing soil fertility or soil conditioning.

Still another object is to provide seed capsules containing fertility-enhancing elements having a high level of plant food nutrients in combination with a high level of soil conditioning properties.

Still another object is to encapsulate a seed in a soil conditioning material using materials rich in plant nutrients as part of the encapsulating agent.

Yet another object is to provide a seed product which reduces the tendency for light weight seeds to be washed away by surface water runoff.

Still another object is to provide a seed product which obviates the typical practice of adding straw as a mulch over e.g. grass seed, to protect the seed from being washed away by surface water, from heat of the sun, and to hold moisture in the soil.

A further object is to provide products wherein a single seed capsule product particle provides enhanced soil texture and enhanced soil nutrient value at nutrient levels traditionally needed by newly-germinated seedlings, optionally with higher levels of plant nutrient suitably spaced from the seed itself so as to not be toxic to seedling growth, optionally in combination with time-release technology.

Yet another object is to provide fertility-enhancing seed capsule products having a suitable level of plant food nutrients in combination with a high level of organic matter as soil conditioning material.

SUMMARY OF THE INVENTION

The invention generally addresses a combination seed capsule, comprising at least one viable seed, having an outer surface and acting as a core or pseudo-core of said combination seed capsule; and a coating of a composition comprising a soil conditioning material mounted proximate, including disposed outwardly of the outer surface of said seed.

In general, the coating provides at least one of (i) enhancing broadcast flight properties of the combination seed capsule; (ii) reducing susceptibility to deleterious affects of weather on the combination seed capsule; (iii) enhancing resistance of the combination seed capsule to attack by animals, weeds, or spore-formers; (iv) staged germination of ones of the seed capsules, having seeds, under a given set of conditions, over a period of time longer than the range of germination times inherent in the seeds; (v) enhancing control of moisture about the seed thereby to assist in seed germination; (vi) release of plant nutrients into soil onto which the combination seed capsule is placed; (vii) soil conditioning effect to soil onto which the combination seed capsule is placed; (viii) staged release of plant nutrients into soil onto which said combination seed capsule is placed, over a period of time longer than the range of times inherent in the chemical composition so released; (ix) higher embryo emergence and survival rate in a population of the seed capsules, thereby reducing required seed planting density for a desired plant population density; and (x) assisting in stabilizing moisture content in soil on which such seed capsule is disposed.

While a wide variety of seeds may be used, in general such seeds are selected from the group consisting of grass, vegetables, grains, and flowers.

Preferably, the coating comprises the soil conditioning material in combination with at least one ingredient effective to reduce susceptibility of the seed capsule to deleterious affect of at least one of animals, weeds, and spore-formers. In some embodiments, the ingredient for reducing such susceptibility of the seed capsule is selected from the group consisting of herbicides, fungicides, for example metalaxyl, and a bitter substance.

In some embodiments, the combination seed capsule further comprises a second coating, separate from the first coating, and comprising at least one ingredient effective to reduce susceptibility of the seed capsule to deleterious effect of at least one of animals, weeds, and spore-formers.

Some embodiments are effective to provide a plant nutrient at a desirable controlled distance from a plant seedling emerging from the seed, in an amount beneficial to the plant seedling.

In other embodiments, the second coating material is intermingled with the first coating material in an outer portion of the first coating, and generally displaced from the seed.

The second coating material can comprise a plant nutrient, beneficial in location and in amount of availability, to a plant seedling emerging from the seed. The second coating composition can comprise an inorganic form of a plant nutrient and can be selected from the group consisting of nitrogen, phosphorous and potassium. The second coating composition can comprise urea or an inorganic form of a plant nutrient and can be selected from the group consisting of e.g., monammonium phosphate, diammonium phosphate, superphosphate, triple superphosphate, dicalcium phosphate, and potash or a nutrient such as sulfur, manganese, copper, boron, iron, magnesium or chromium.

A population of the seed capsules can comprise coatings having a range of properties affecting germination rate of the seeds, thereby to stage germination of the seeds in the population over a period of time longer than the range of germination times inherent in uncoated ones of the seeds. Such properties can be, for example, a range of hardness, or a range of thicknesses, of the coatings.

The coating can comprise a first layer of the soil conditioning material, and a second layer comprising an inorganic, and/or organic, fertilizer, and/or at least one nutrient, such as, for example, sulfur, manganese, copper, boron, iron, magnesium, or chromium.

A preferred soil conditioning material is a sludge composition, such as fiber-containing by-product of a paper making operation, or sewage sludge.

The seed capsule can comprise a water-leachable plant nutrient, and/or a leach-retardant composition, such as wax, effective to retard leaching of the leachable plant nutrient out of the combination seed capsule.

In some embodiments, in a population of the combination seed capsules, the coatings in ones, but less than all, of the population, comprise ingredients effective to retard effective penetration of a seed-germinating environment to the seed for germination thereof.

In embodiments preferred for some applications, the seed capsule comprises an inner layer on the outer surface of the seed, and an outer layer, the inner layer enhancing properties of the seed for acting as nucleus in an agglomeration operation agglomerating the coating onto the inner layer.

In some embodiments, the coating comprises an admixture of the soil conditioner and a plant nutrient.

In preferred embodiments, the coating remains generally disposed about the seed, and preferably but not necessarily remains generally intact about the seed, until the seed germinates.

The invention further comprises a plant growing medium extending over an area, the plant growing medium having a root zone, and a top surface of the root zone generally corresponding with a top surface of the plant growing medium, the plant growing medium having a first overall soil condition and texture; and a population of seed capsules disposed over the top surface of the plant growing medium, the seed capsules comprising individual seeds, having outer surfaces, and coatings of soil conditioning material disposed outwardly of the outer surfaces of the seeds, the coatings of the seed capsules providing localized germination and growth environments, at and adjacent the seeds, having texture, and nutrient and water holding properties for supporting seedling health, superior to respective properties as provided overall in the root zone of the plant growing medium.

The invention yet further comprises a method of providing plant micronutrients to soil, the method comprising placing onto the soil a population of combination seed capsules, each comprising at least one seed, and a coating comprising a plant nutrient material.

The coating can comprise a first coating comprising the plant nutrient, and a second coating, separate and distinct from the first coating, and comprising a soil conditioning material.

The invention yet further comprehends a method of providing a seed bed having enhanced growing conditions for growing seed, the method comprising coating a population of the seeds with a coating material, and thereby providing coatings thereon of such material, the material tending to stabilize, in the seed capsules, or in soil on which the seed capsules are disposed coating compositions which tend to hold, moisture adjacent the seeds in the seed capsules or in soil adjacent the seed capsules, in such quantities and for such times as to enhance growing conditions for the seeds; and placing the population of seeds on soil effective to support germination of the seeds which are in the seed capsules.

Is some embodiments, the seed capsules comprise inner layers on the outer surface of the seeds, and outer layers, the inner layers enhancing properties of the seeds for acting as nuclei in agglomeration operations agglomerating the coatings onto the inner layers.

The invention yet further comprehends a method of making a population of combination seed capsules, each comprising a seed, and a coating of a soil conditioning material, the method comprising pre-coating the seed with a material which enhances the ability of the seed to act as a nucleus in an agglomeration operation to form a pre-coated substrate; and subsequently coating the pre-coated substrate with a soil conditioning material. A preferred pre-coating material comprises dicalcium phosphate.

In general, the pre-coating step typically results in an overall increase in the density of pre-coated seed combination. The pre-coating step can be accomplished by, for example, spraying the pre-coated material onto the seed, and subsequently driving off such as by drying, as necessary, any solvent or other liquid carrier used for application of the coating material to the seed.

In yet other expressions, the invention comprehends a method of providing an enhanced seed germination environment in combination with placement of a controlled amount of plant nutrients in controlled proximity to each seed, the method comprising providing a population of seeds, coated with a soil conditioning material which tends to enhance germination of the seeds, and with plant nutrient composition effective to enhance growth of plant embryos emerging from the seeds; and placing the population of seeds on soil effective to support germination of the seeds. In such method, the coating material can include a second ingredient comprising plant nutrient moieties.

DETAILED DESCRIPTION OF THE INVENTION

Figure 1:
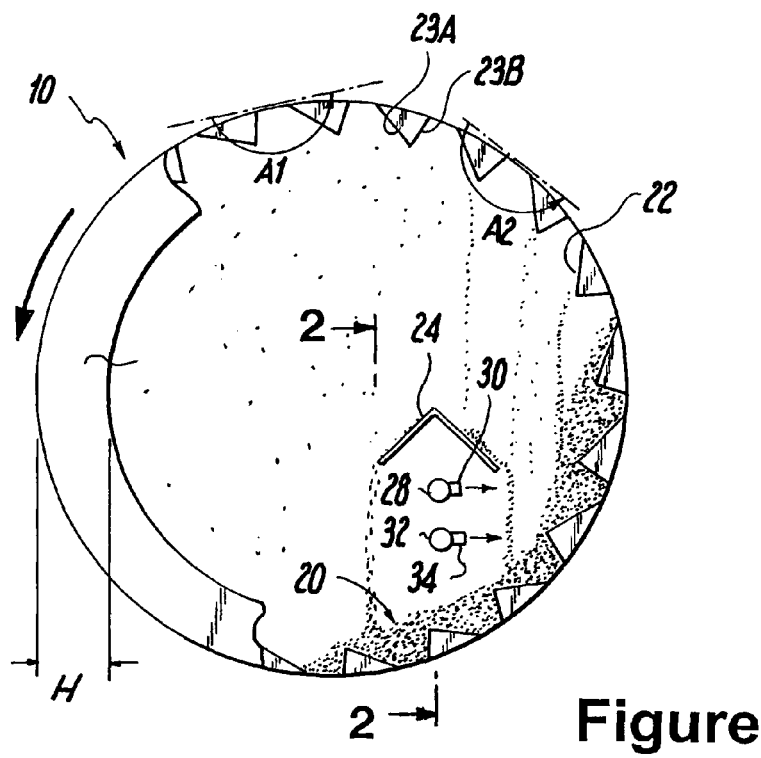
FIG. 1 is a transverse cross-sectional view of a coating drum suitable for spray-coating substrate seed according to the present invention.

The following is a detailed description of the illustrated embodiments of the present invention which provides combination seed capsule products that provide for a combination of efficient and proper seed placement in the soil, soil conditioning properties at the specific site of the seed, plant nutrients at or near the specific site of the seed, ingredients effective to reduce deleterious effects of spore-formers and animals, and/or other various physical benefits/properties of the combination seed capsule not previously available in a single product.

In general, at least one seed substrate and at least one soil conditioning material are selected as raw materials, and are combined to make a combination soil conditioning seed capsule product of the invention.

The invention can operate with any of a wide variety of soil conditioning materials such as municipal or other sewage sludge, scrubber sludge, paper mill sludge, fly ash, dust, animal waste, other organic materials, and mineral soil conditioning materials.

The soil conditioning material can be a solid material having a melting temperature so high that handling such material in the melt state is impractical and/or undesirable in view of the limited temperatures at which the seed will remain viable. For example, the soil conditioning material may be combustible at a temperature lower than its melt temperature, or will melt only above temperatures which can tolerated by the seed, such that viability of the seed would be destroyed if melting were attempted in an environment which exposed the seed to such temperatures. Thus, handling such material in the melt state is impractical, whereby other methods of handling the soil conditioning material may be desired.

Solid sewage sludge, sawdust, and solid animal waste are representative of soil conditioning materials which cannot be readily melted. In the alternative, some soil conditioning materials such as sewage sludge, paper mill sludge, sawdust, and solid animal waste can be suitably comminuted and then dissolved or suspended in water or other solvent composition for processing purposes, optionally along with other soil conditioning materials and/or inorganic chemical fertilizer materials, and the solvent subsequently driven off to make a resulting solid product.

Chemical fertilizers generally are distributed in commerce as solid state materials. Such material is generally produced in manufacturing steps either in solution or in the melt state to meet a specified narrow range of size, hardness, and plant nutritional characteristics, distinct to the application of each such product. Examples of such fertilizers include nitrogen, phosphorus, and potassium containing products such as urea, monoammonium phosphate, diammonium phosphate, superphosphate, triple super phosphate, dicalcium phosphate, potash, and the like. The chemical fertilizer can be a mixture or other physical combination of known inorganic fertilizer chemicals, and may include desired amounts of nutrients such as sulfur, manganese, copper, boron, iron, zinc, and the like.

In preferred embodiments of this invention, a precursor seed capsule, having one or more coatings of the soil conditioning and/or other material thereon may first be prepared as a solid or semi-solid particle or agglomerate. The soil conditioning raw material may be a particulate powder, or may be fibrous, or may be a suspension of a powder or fibrous material in a liquid carrier, and is preferably coated onto the substrate seed to form a seed capsule or other agglomeration of particles, fibers, or the like. Where the soil conditioning material is, for example, sewage sludge, the sewage sludge raw material can be obtained as a slurry that may be bound together as with a binder, preferably an organic binder, when dried. The slurry may be spray-applied to the substrate seeds, for example to a rolling be of such seeds, in combination with a flow of air to evaporate water from the thus-applied coating. Such sewage sludge, or paper mill sludge, need not be reacted or otherwise treated with any acid, caustic, or any other chemical before being applied and/or dried, or partially dried, either in preparation for, or after, the slurry application of the sludge to the seed substrate.

Specifically, the sewage sludge or paper mill sludge used herein as soil conditioning raw material need not be treated to transform such sludge into colloidal form. Thus, the sludge preferred for use herein is generally non-colloidal in nature, and is distinguished by its non-colloidal nature from conventional sludges which are specifically treated to provide the colloidal characteristics thereto.

Natural lignin, lignosulfonates, and the like, may serve as suitable binders where the soil conditioning material is, for example, paper mill sludge, raw wood, sewage sludge, or other organic or inorganic material. In the case of, for example, calcium chloride or other inorganic additives, such materials may be added to the primary coating, e.g. onto or into the sludge coating, by well-known processes.

Soil conditioning material used therein may be devoid of such conventional plant nutrients as nitrogen, potassium, and phosphorous, or may have such limited plant nutrient value, or may be so unbalanced in nitrogen, phosphorous, and potassium content, that the soil conditioning material may not, by itself, be a desirably complete material for use as the only ingredient in the seed coating. Thus, such soil conditioning material may have limited application herein where basic level of soil fertility is seriously degraded. However, all soil conditioning materials contemplated herein beneficially modify soil to which they are applied, in some way other than direct provision of nitrogen, phosphorous, and/or potassium or other plant nutrients. By use of soil conditioner in intimate association with the seed, this invention not only enhances soil condition of the growth medium/soil to which it is applied, it also provides soil conditioning value to the seed so coated, and in intimate association with the seed, irrespective of the general tilth condition of the growth medium into or onto which the seed capsule is applied.

Further to preferred embodiments, typically a first coating material (e.g. soil conditioning material) is readily converted into liquid state such as liquid suspension, and is provided to the process as a liquid. As a general statement, the first coating material may be sprayed onto the substrate seed, then is converted back to solid state on the thus-created seed capsules or seed capsule precursors. In the alternative, the coating material may be mixed with the seed in an (e.g. ribbon) blender, or may be otherwise coated onto the substrate seed in an agglomeration process according to well-known conventional agglomeration principles.

Regarding the coating process, the coating material can accumulate as a single or multiple layer coating on the outside of the seeds to form a population of combination seed capsules. The layer or layers of coating material can be a homogenous or heterogeneous mixture of the desired elements. Further, such population of combination seed capsules can have a range of hardnesses and thicknesses for improved seeding treatments.

Cooperating inner and/or outer layers may be used e.g. to control direct contact between the seed and moisture. Suitable materials and processes therefore are taught in U.S. Pat. No. 3,698,133 Schreiber and U.S. Pat. No. 4,759,151 Gerber, and are thus well known in the art.

In some embodiments, a second coating material may penetrate into the layer of soil conditioning coating material. Such penetration may comprise a generally uniform distribution of the second coating material throughout the first coating material, or may represent a more stratified or otherwise heterogeneous distribution of second coating material in or on the first coating material.

In other embodiments, the coating materials may be mixed into a heterogeneous layer. Such layer or layers of heterogeneous material can then be coated upon the outside surface of the seed.

Where the liquid state of a coating material was obtained by slurrying or otherwise combining the coating material with water, the liquid fraction is reduced after application of the liquid-state material to the substrate seed, or to the growing seed capsule, to effect solidifying of the coating material after application of the coating material to the substrate seed. The liquid fraction is reduced by driving off the liquid carrier, as by medium or low temperature air, or vacuum or other flash drying, after or during application of the coating material to the substrate seed. The resulting solid seed capsule, comprising the seed coated with the e.g. sludge coating material, is then recovered as a combined soil conditioning seed capsule product of the invention.

Spraying of the liquid coating material can be accomplished by a variety of known processes such as, but not limited to, pneumatic, hydraulic, or electrostatic spraying processes. The temperature and pressure of the material being sprayed depends on the material selected, and the viscosity and other parameters of the respective material in the respective liquid state. While high atomization is desired, such is not critical. The liquid coating material need only be atomized sufficiently to provide a generally uniform coating on the substrate seeds, as determined after the coating and solidification steps in fabricating the seed capsule product are completed.

Indeed, the uniformity of coating or coating thickness about the seed is typically not critical so long as the seed is not on or immediately adjacent an outside surface of the capsule such that the seed may fall out, or be easily broken out, of the capsule, or easily removed by dissolution of materials at and near the surface of the seed capsule. In addition, the seed should not be so near the outside surface of the capsule as to be in a nutrient layer having such high concentration of nutrient as to be toxic or otherwise detrimental to viability or growth of a plant emergent from the seed.

Spray application of the coating is suitably controlled to achieve the required addition of the spray material, liquid and/or powder, coating to the substrate seed or precursor seed capsule. An illustrated method of applying the liquid material to the substrate seed or precursor seed capsule is by using a rotating drum spray-coating apparatus. Other apparatus and methods, for example a tilted pan coating process, can be used to apply the soil conditioning material and optionally a chemical fertilizer material onto the substrate seed. The coating operations can be batch operations or continuous operations.

Figure 2:
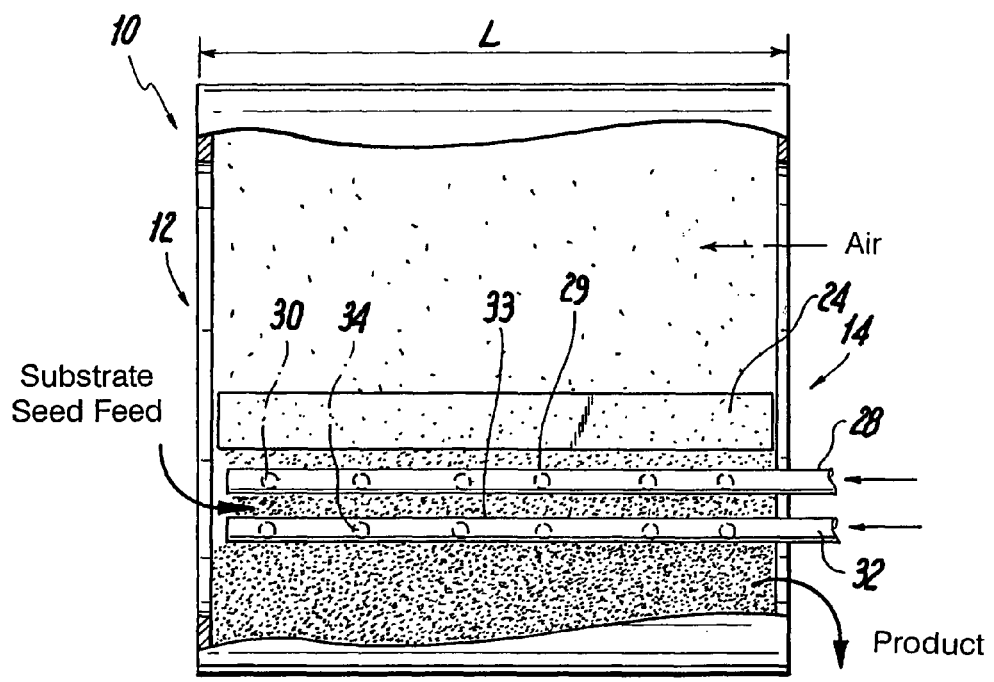
FIG. 2 is a partially cut away view showing a length of the drum of FIG. 1.
Figure 4:
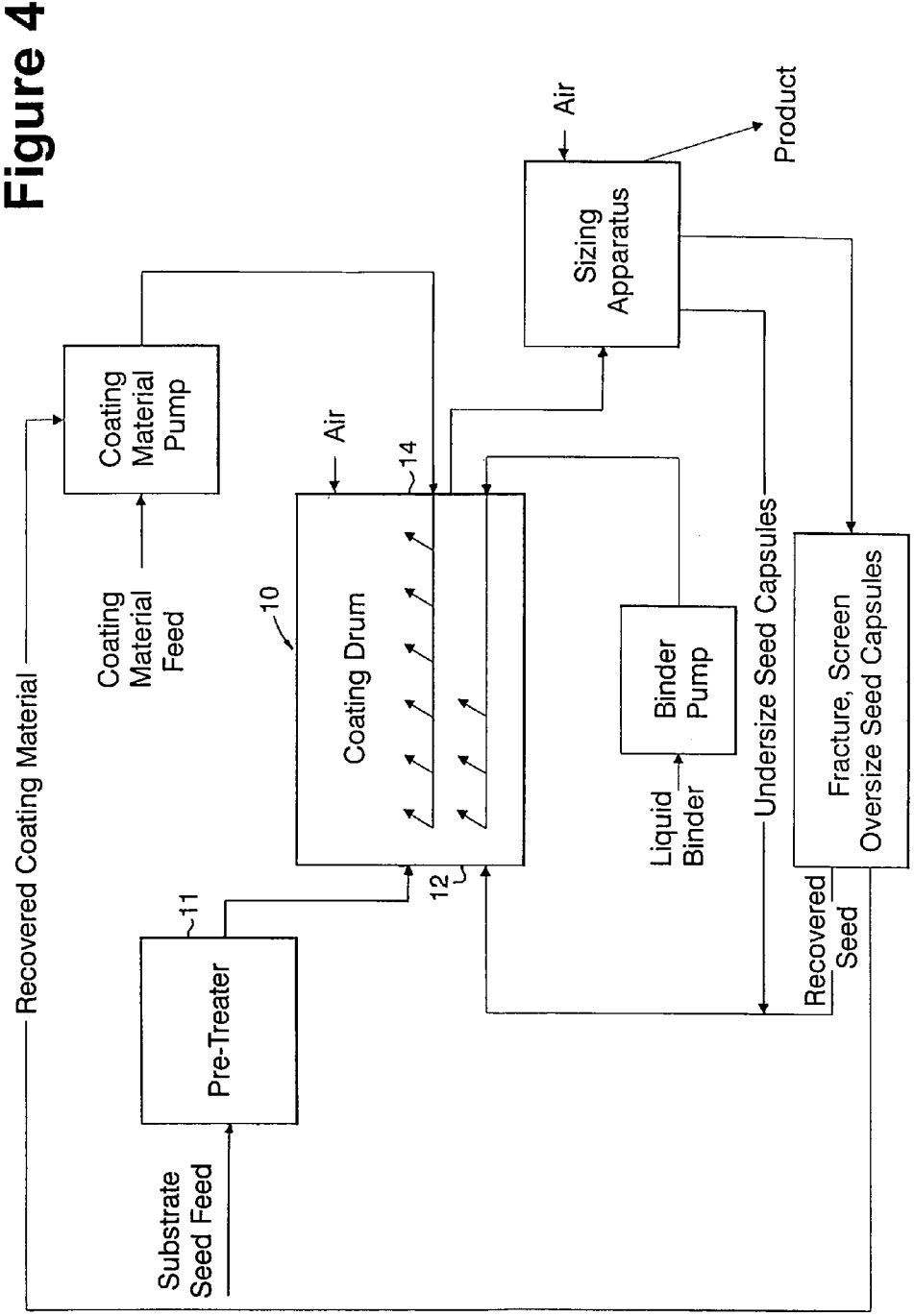
FIG. 4 is a block diagram illustrating a second manufacturing process for producing combination seed capsule product of the invention.

As illustrated in FIGS. 1, 2 and 4, spray apparatus can operate within a rotating drum disposed in a generally horizontal orientation. The drum may incorporate internal lifting flights which lift free-flowing (e.g. seed and growing seed capsule) particles in the drum and then let the particles fall to the bottom of the drum as a continuously falling curtain or cascade. In some embodiments, the interior of the drum is either clean and free from any flighting, or has only mixing fingers or flights that expand the area by the bed, that keep the bed rolling as the drum rotates, and that generally improve mixing, rather than lifting particles to the top of the drum and then releasing them in a falling cascade. However, such lifting of particles to the top of the drum, and corresponding falling cascade or falling curtain, are not excluded from processes of the invention. Rather, both such finger mixing, and such lifting coupled with falling cascade or curtain, are included within the scope of the invention.

Stationary spray nozzles are positioned within the drum to project the sprayed material onto the rolling bed, and optionally onto any curtain or cascade of falling particles. For a continuous process, the drum is preferably inclined at a small angle from horizontal, such as, without limitation, about 0.25 inch to about 0.38 inch from the horizontal for each foot of length of the drum, so that rotation of the drum causes the particles to move from the inlet end of the drum to the discharge end, while maintaining a relatively uniform bed thickness. The optimum degree of incline varies with each set-up and may thus be outside the above range. The important parameter is that the incline contribute to maintaining a bed of seed and seed capsule particles having sufficient uniformity that the spray material can be effectively applied to the particles passing through the drum. The particles are then discharged at the discharge end of the drum.

FIGS. 1 and 2 show schematically a first embodiment of processing equipment which may be used to produce seed capsules of the invention. Such processing equipment includes a drum and sprayer combination suitable for continuously producing coated seed capsules in accord with the invention. Use of the illustrated drum and sprayer combination is not critical, however, as other drum and sprayer combinations, or other coating methods such as pan coating methods, are also suitable. Referring to FIGS. 1 and 2, drum 10 has an inlet end 12 for receiving the substrate seed material or materials, or partially formed or pre-coated seed capsule precursors. Drum 10 has a discharge end 14 through which agglomerated or otherwise coated seed capsule product particles are discharged over discharge retaining ring 16. A variable speed rotary drive (not shown) is provided for supporting and rotating the drum 10 in a counterclockwise direction as viewed in FIG. 1 at controlled, and changeable drive speeds. Conventional slope adjustment apparatus (not shown) is provided for routine and ongoing adjustment the slope of the drum from horizontal.

Air is preferably supplied from discharge end 14 as shown in FIG. 2, and flows countercurrent to the direction of travel of the seed substrate material. Since the contemplated coating materials are generally applied to the seed in liquid, or semi-liquid, or other moist form, and since some coating materials may thus tend to form clumps or otherwise self-agglomerate when exposed to ambient moisture conditions, air supplied at discharge end 14, and elsewhere in the process for contact with the coated seed and seed capsules, is preferably dried in order to cost-effectively remove an optimum amount of the moisture from the coating material and to assist in maintaining suitably low moisture content in the thus coated and dried seed capsules.

A first stationary spray assembly 28 extends longitudinally within drum 10 above and adjacent the bed 20 of seed and/or seed capsules. First spay assembly 28 includes pipe 29 and nozzles 30. A second spray assembly 32 extends longitudinally within drum 10 generally adjacent first spray assembly 28. Second stationary spray assembly 32 includes pipe 33 and nozzles 34, which transport the material to be sprayed. Nozzles 30 and 34 are connected to pipes 29 and 33 respectively, and project sprays of liquid or otherwise particulate coating material toward the bed of seeds and/or seed capsule precursors. The description of spray assemblies 28, 32 as stationary means that the spray assemblies to not rotate with drum 10. However, the positions of either nozzles 30, 34 or pipes 29, 33, or both, can be adjusted within the drum for proper direction of the respective spray or sprays onto the bed of seeds and/or seed capsules or seed capsule precursors.

A stationary protective cover 24 is mounted over the spray assemblies. Seeds and/or seed capsules falling from the inner surface of the drum and the flights, above the spray assemblies, fall onto the cover, and are deflected away from the spray assemblies, as shown in FIG. 1. Thus, cover 24 protects the pipes and nozzles from the falling seeds and seed capsules falling onto and fouling the pipes and spray nozzles.

As drum 10 rotates, flights 22 lift and mix the seeds, seed capsule precursors, and seed capsules, but do not generally carry the bulk of the seeds and seed capsules up to the top of the drum. Some small amount of seeds, seed capsule precursors, and seed capsules will be carried upwardly to the top of the drum by even a drum devoid of any flights. Thus, all drums experience some amount of seeds and seed capsules falling from the upper part of the rotating drum whereby cover 24 is beneficial for protecting spray assemblies 28 and 32.

Preferred flights 22 are primarily directed toward enhancing mixing of the bed 20 of seeds and seed capsules, continually refreshing the surface of the bed with a newly-emergent supply of seeds and seed capsules, rather than lifting and subsequently dropping the seeds and seed capsules which may be fragile when initially coated. To that end, each flight 22 preferably, but without limitation, has a leading surface 23A extending at an obtuse angle "A1" of at least 90 degrees with respect to the inner surface of the drum. A more preferred angle "A1" is about 100 degrees to about 150 degrees. Trailing surface 23B of flight 22 can be virtually any angle, with the inner surface of the drum, which angle does not interfere with the operation of adjacent leading surfaces 23A.

Additional retaining rings can be added to the assemblage shown in the drawings, in order to provide that height "H" to the retaining ring which will provide and maintain the optimum configuration of bed 20 inside drum 10.

As noted above, inlet end 12 of the drum may be raised above discharge end 14. When in use, the drum rotates continuously. Seeds or previously thinly-coated or partially-coated seed capsules are continuously fed into inlet end 12 and thus added to rolling bed 20. Flights 22 continuously mix the bed as the drum rotates, refreshing the bed surface with newly fed seeds, or seeds and seed capsules newly brought to the surface by the continuous rotation of the drum in combination with the mixing action of the flights. Spray assembly 28 sprays the desired coating material (e.g. sewage sludge, paper mill sludge, or other coating composition, onto the continuously moving and mixing surface of bed 20 from a plurality of nozzles 30 distributed along the length of pipe 29, and similarly along the length of drum 10, adding the sprayed material to the seeds and seed capsules in bed 20. After receiving the spray coating from spray assembly 28, the seed capsules are discharged through discharge end 14. In some embodiments, the seed capsules pass through a cooling chamber, not shown integral in drum 10, before being discharged through discharge end 14.

In general, as the seeds traverse the drum, from inlet to discharge, nozzles 30 atomize the liquid or other coating material and spray such atomized coating material as e.g. droplets of the coating material onto the seeds in the bed. The result is that the seeds become generally uniformly coated with one or more layers of the coating material such that the coating material becomes an integral part of the respective seed capsules fabricated in the drum. As the coating material solidifies on the seeds, the coating material tightly bonds to the respective portions of the seeds.

As the seeds and seed capsules roll and mix with rotation of the drum, the incline of the drum causes the seeds and seed capsules to travel from inlet end 12 toward discharge end 14.

In the alternative, or where a coating material is not readily self-bonding to the seed material, a binder material can be provided toward the inlet end of the drum at spray assembly 32, through pipe 33 and nozzles 34. In such embodiment, the binder is preferably sprayed onto the seeds closer to inlet end 12 rather than along the entire length "L" of the drum. The coating material is then preferably sprayed onto the seeds downstream from the inlet end, and preferably relatively downstream of nozzles 34. Thus, the seeds receive a first coating of the binder, and a subsequent second coating of e.g. liquid soil conditioning coating material overlying the binder.

Binder material applied as e.g. through spray assembly 32 may contain additional coating components such as e.g. flyash, lime, gypsum, or the like, as one or more components for assisting in adding bulk and thickness to an inner binder layer prior to any, or the majority of, the application of the organic coating material (e.g. sewage sludge or paper mill sludge).

In some embodiments, binder and liquid soil conditioning coating material are applied at similar locations along length "L" of the drum whereby binder and soil conditioning coating material may become intermingled/mixed before reaching the seeds, or on the seeds. For example, liquid soil conditioning coating material may be sprayed onto the seeds along the full length of the coating chamber in drum 10 while spraying of the binder material onto the substrate seeds is done relatively closer to or adjacent the inlet end of the coating chamber of the drum. Thus, a first binder layer may underlie or be mixed with the soil conditioning coating material, and may be overlain by a second layer of the soil conditioning coating material. Thus, in this embodiment, the binder layer may typically be a combination of binder material and coating material.

Further, it is contemplated that the soil conditioning coating may be applied first, followed by application of binder or inorganic fertilizer or sealer coating, in which case the binder or inorganic fertilizer or sealer may serve as an outer shell, temporarily trapping the inwardly-disposed materials inside the seed capsule. In the alternative, the soil conditioning coating may be applied first, followed by application of the binder, and wherein the binder penetrates through the soil conditioning coating, either physically or chemically, to the underlying substrate seed and there provides the binding property.

Additional spray assemblies can be provided, spraying additional materials (e.g. inorganic fertilizer materials) onto the substrate seed. Thus, e.g. 6 spray assemblies can spray 6 different coating materials onto the substrate seed. For example, a first spray material can be a binder or primer material intended primarily to enhance bonding of subsequent sprays to the substrate seed. Continuing the example, a second spray can be a combination of binder and finely comminuted particulate material such as lime and/or flyash. A third spray may be a soil conditioning material such as a paper mill sludge or a municipal sewage sludge. Fourth, fifth, and/or sixth sprays can add nitrogen, phosphorous, and/or potassium plant nutrient ingredients, alone or in combination, or as combinations. In this manner, the soil conditioning properties of the seed capsule can be established, and the plant nutrient level of the seed capsule can be enhanced to provide substantially any level of major and/or minor plant nutrients desired in the seed capsule, at substantially any relative ratios of the respective plant nutrients, and wherein the preferably primarily soil conditioning coating provides desired soil conditioning properties in the resulting product, initially for use by the specific seed contained therein, and ultimately as additive to the overall tilth of the growth medium such as soil into or onto which the seed capsule is eventually planted.

A preferred, and rather simplistic, embodiment of the invention is provided by spraying a soil conditioning liquid suspension of sewage sludge or paper mill sludge onto seeds to be encapsulated to make seed capsules. By controlling the amount of the soil conditioning sludge, or by controlling the residence time of the seeds in the drum, a desired thickness of soil conditioning coating can be provided in the resulting coated product.

Typical dried sewage sludge, as a raw material, contains about 2-6% nitrogen, up to about 2% phosphorous, and generally no potassium, and thus has little or no market value as a fertilizer (plant food) product per se. However, by adding e.g. urea, the nitrogen content can be raised if desired, especially as a coating on or adjacent the outside surface of the seed capsule, whereby the combination fertility-enhanced, soil conditioning, seed capsule product has real market value as a comprehensive, self-contained, value-added, seed capsule product. Such product thus contains the seed, a soil conditioning composition which operates somewhat as a seed incubator providing a beneficial germination environment, and a starter quantity of fertilizer selected in quantity and placed in location so as to provide improved, ideally optimum, amounts of plant nutrients at optimum location for use by the newly-emerged embryonic plant at the germination stage of seed development.

Starting with a sludge coating having 2% by weight nitrogen, sufficient urea may be added to bring the nitrogen content to, for example, 5%, 7%, 8% or 10% nitrogen, or more, depending what analysis is desired. Starting with a sludge coating having 6% nitrogen, sufficient urea may be added to bring nitrogen content to, for example, 10%, or whatever other analysis is desired. Phosphorous and/or potassium components and/or materials having combinations of plant nutrient elements (e.g. NPK) can, similarly, be added to the sludge, either before, after, or during addition of the urea. In addition, nitrogen, potassium, and/or phosphorous-containing materials can be combined with the sludge prior to the sludge being applied to the seed.

It should be understood that the more porous the established soil conditioning coating, or e.g. the outer surface of such coating, the more any subsequent spray material penetrates the established coating. All such penetration is contemplated in use of the term "coating" herein.

In some preferred embodiments, the overall coated combination seed capsule product comprises seed capsules wherein substantially the entirety of the soil conditioning material is confined to a contiguously-defined portion of the seed capsule. In such embodiments, the structures of the finished product seed capsules comprise coatings of contiguously arranged elements of the soil conditioning material, generally arrayed entirely or substantially entirely about the seed, which coatings may be overlain by an additional layer, optionally discontinuous, of organic or inorganic chemical fertilizer. Further coating layers of either soil conditioning material or organic or inorganic chemical fertilizer can be applied over the additional layer.

In addition, or in the alternative, other layers of other materials whether soil conditioning materials, organic or inorganic fertilizers, or other materials, can be applied to the substrate seed before applying the above mentioned layer of soil conditioning sludge. Thus, the substrate seed can be coated with a layer of a calcium compound e.g. calcium chloride, calcium carbonate, or dicalcium phosphate, or with a sulfur moiety, and/or a further layer of urea, all with optional use of binder materials.

Further to the structure of the seed capsules of the invention, the coatings on the seed capsules need not generally represent a uniform mixture of the inorganic chemical fertilizer and the soil conditioner. Rather, in a typical seed capsule a core substrate seed is overlain or encapsulated by a soil conditioning material, and is generally free from a second overlying soil conditioning coating material, and wherein the inorganic fertilizer content at the seed/coating interface is relatively higher so as to represent a second coating material such as an inorganic fertilizer coating, as compared to the inorganic fertilizer content at locations at and adjacent the seed.

The second coating can, and preferably does, in some embodiments, penetrate into voids or other interstices in an underlying e.g. soil conditioning coating. However, preferably most if not all elements of the underlying e.g. soil conditioning coating material are generally interconnected with each other without intervening coating material of the second layer, except for an optional binder used to hold the first coating material together as a unitary structure, separate from any structure and bonding provided by the second coating material.

While the combination seed capsule can comprise discontinuities in the soil conditioning sludge coating layer, in combination with an inorganic fertilizer material in such seed capsules, such compositions are less preferred.

Regarding the coating process, FIG. 4 illustrates in flow sheet form a manufacturing process for producing seed capsules of the invention, using the coating drum 10 as described above. It should be understood, however, that other equipment such as a pan pelletizer, a paddle mixer, or the like can be used in place of the rotary drum to obtain combination seed capsules of the invention.

The coating process operates according to conventional and generally well known agglomeration principles, as described by Wofgang B. Pietsch in an article entitled "The Agglomerative Behavior Of Fine Particles." Such coating process uses water and heat, along with physical and/or chemical adhesives and like properties, to bind or agglomerate a plurality of types of particles and/or materials into coated seed capsules, each typically containing an individual seed.

To obtain agglomerates from relatively smaller particles of raw materials, binding forces must act within the individual developing agglomerate particles. According to known agglomeration principles, five different binding mechanisms are known to be useful for building agglomerate particles including solid bridges, interfacial attractions and capillary pressure, adhesion and cohesion, attraction between solid particles, and form-closed bonds.

At elevated temperatures, solid bridges can form by diffusion of molecules from one particle to another at the points of contact. Heat can be introduced from an external, secondary source or created during agglomeration by friction and/or energy conversion. Solid bridges can also be build up by chemical reaction, crystallization of dissolved substances, hardening binders, and solidification of melted components.

Capillary pressure and interfacial attraction forces in liquid bridges can create strong bonds that disappear if the liquid evaporates and no other binding mechanisms take over.

Highly viscous bonding media such as tar and other high molecular weight organic liquids can form adhesive and/or cohesive bonds very similar to those of solid bridges. Thin adsorption layers are immobile and can contribute to such bonding together of fine particles under certain circumstances.

Typical short-range forces of the van der Waals electrostatic or magnetic type can cause attraction between solid particles whereby the particles stick together if such particles are sufficiently close to each other. Decreasing particle size clearly favors such attraction between solid particles.

Fibers, little platelets or bulky particles can interlock or fold about each other resulting in "form-closed" bonds.

Figure 3:
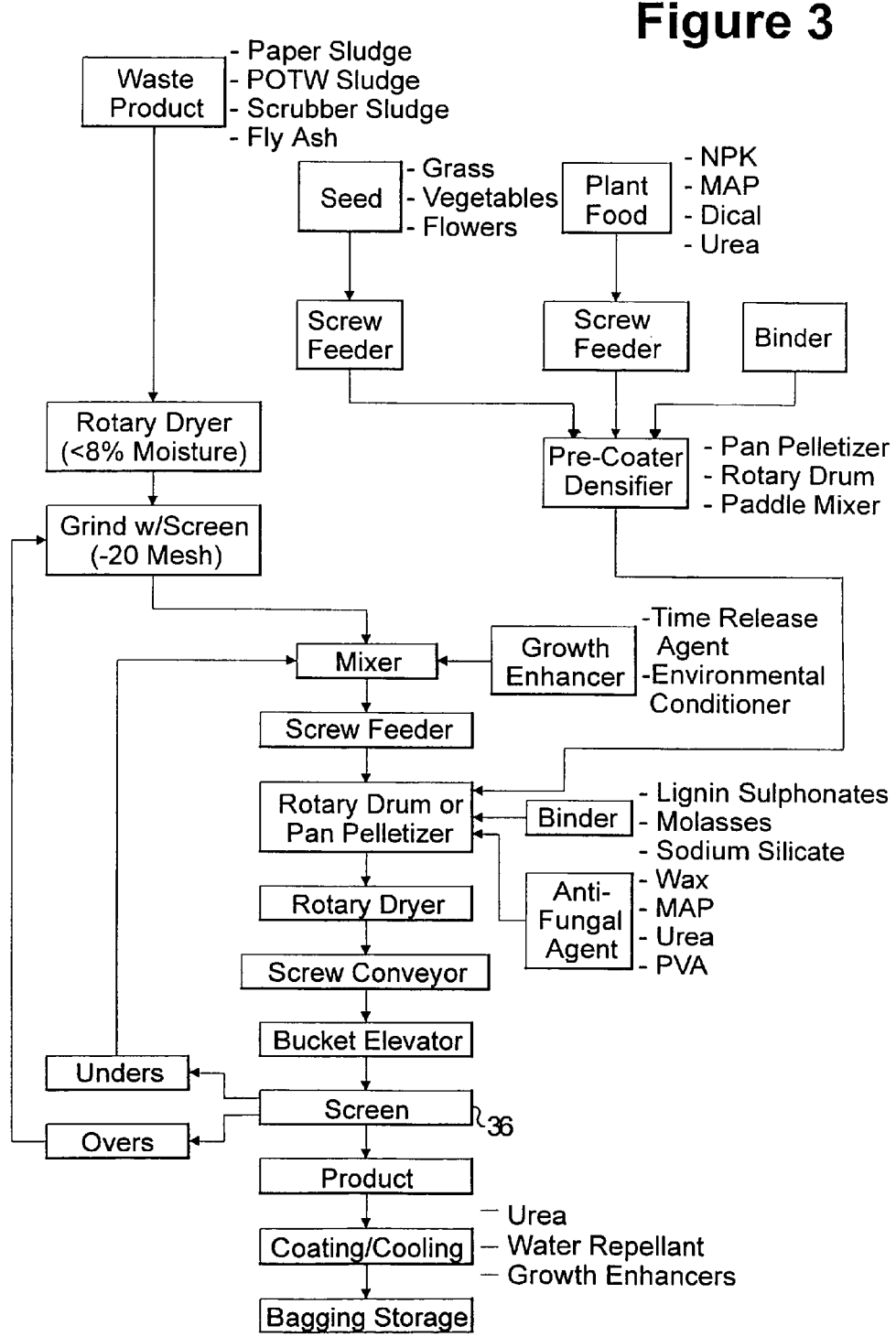
FIG. 3 is a schematic representative flow diagram illustrating a first manufacturing process for producing combination seed capsule product of the invention.

Now referring to FIG. 3, in some embodiments of the coating/agglomeration process, it is desirable to pre-coat the seeds prior to implementing agglomeration principles to produce the above described coating of soil conditioning material. Such embodiments comprise light-weight and/or elongate shaped seeds (i.e. grass seeds), or other similar type of seed which may not readily or inherently serve as a nucleating agent in a conventional agglomeration process with the respective soil conditioning material which is desired to be coated on the seed. Pre-coating the grass seed, for example, enhances the agglomeration of paper sludge as a coating material, of binder and/or of other coating substances, by increasing the weight of the pre-coated grass seed and by providing a more filled in, more rounded shape to such long and narrow seeds. The increased weight and more filled in shape of the grass seed enables more effective, more efficient, processing of the seed in coating apparatus such as that illustrated in FIGS. 3 and 4.

Referring to FIG. 3, the form and composition of such pre-coating, when needed, can vary according to the weight, shape, composition, and surface properties of the seeds, and according to the binder, if any, the soil conditioning coating or coating materials to be applied, and any other inorganic or organic coating material to be applied.

The seeds, whether pre-coated or not, are received within the rotary drum where the soil conditioning material is spray coated onto the substrate seeds to obtain combination seed capsules.

Before coating the seeds with a soil conditioner, the organic soil conditioner material (e.g. paper sludge) is preferably processed through a dryer such as a rotary drum dryer, as needed, to reduce the amount of moisture in the organic soil conditioner material to less than about 8% water by weight. Such drying is an essential step where the material is otherwise above the nominal 8% effective water content, to enable grinding the sludge to a size less than US Standard 20 mesh screen, and to prevent the particles from agglomerating with each other. Certain of the coating materials, e.g. fly ash, because of their physical properties, need not be dried before being ground to a suitable size for participating in the agglomeration operation.

The seeds, whether pre-coated or not pre-coated, and the one or more soil conditioners, are received within a mixer where growth enhancers such as time release agents and/or other environmental conditioners may be added to form a combination seed capsule. The thus pre-coated seeds are then received into a pan pelletizer, a rotary drum, or the like, where binders such as lignin, lignosulphonates, molasses, sodium silicate, wax, monammonium phosphate, or urea can be added and thereby coated onto the pre-coated seeds. Other materials which can be added to the seed capsule at the e.g. rotary drum include anti-fungal coatings such as with metalaxyl fungicide, for example, Apron® and/or Subdue®, available from Novartis, Inc. of Greensboro, N.C.

The such-coated seeds are then passed into a rotary or other dryer in order to obtain a seed capsule containing 5% or less water. The maximum water fraction in the coating can vary according to the composition of the coating material, so long as the resultant seed capsules remain suitably structurally strong and so long as a population of such coated seed capsules remains free flowing in solid condition. The process for fabricating the seed capsules must maintain a temperature sufficiently low that the seeds are not heated so hot that viability of the seeds, for germination purposes, is not dramatically compromised. It is generally preferred that the temperature of the seeds be suitably controlled such that any binder and/or coating material, or other materials applied to the seeds, cool at a controlled rate while bonds form between the seeds, or seed capsule precursors and the one or more soil conditioning and/or other coating materials. Such temperatures of all materials are suitably controlled to avoid decomposition of the respective materials, loss of viability of the seeds, or breakage of seed capsules or seed capsule precursors, or coatings or coating or other materials during such processing. The temperature at the rolling seed bed inside drum 10 generally can range from about 130 degrees F. to up to at least 230 degrees F. for seed residence times up to at least 1 hour. At drum operating temperatures of less than 130 degrees F., drying time can become excessive. At temperatures above 230 F, the viability of the seed may be at risk, depending on the sensitivity of the seed, residence time, and other influential parameters.

The above stated temperature range is illustrative and not limiting, and will vary depending on the seed, the coating materials, and the specific process parameters of a particular coating system and coating operation. Thus, maximum e.g. drum coating temperatures can be less than 130 degrees F. or more than 230 degrees F. However, the stated range is preferred, including all temperatures within such range as, for example, 150 degrees F., 180 degrees F., 210 degrees F., and the like.

Referring to the drum of FIGS. 1 and 2, and to the pan pelletizer block in FIG. 3, the seeds are fed continuously to an inlet as at inlet end 12 of drum 10. Combination seed capsules, produced as described above, are released from a discharge locus such as discharge end 14 of the drum to a sizing apparatus 36 in which the seed capsules are sized through conventional sizing elements. Suitably-sized seed capsules are discharged from the sizing apparatus as product for distribution. Undersize seed capsules are fed back into mixer as shown in FIG. 3. Oversized seed capsules are fractured and screened for reprocessing.

The recovered seed product can be further coated with any of the coating materials described above, such as urea or other inorganic or organic fertilizer, and/or with growth enhancers or other desirable materials. Further, other types of coating materials such as water repellents can be coated onto the discharged seed capsules for the purpose of importing additional desirable properties to the seed capsules.

In the process of coating porous organic materials such as sewage sludge or paper mill sludge as is optional in the invention, with a second material which is applied for other than imparting soil conditioning properties, for example an inorganic fertilizer, the general size of the coated seed capsule may be the same after applying the second material (e.g. inorganic fertilizer) as the size of the previously-coated seed capsule, or may be similar in size. Namely, the quantity of coating material added to the seed capsule can be so small as to not materially affect seed capsule size, or the coating material can be received into an e.g. porous interior of the soil conditioning coating of the seed capsule, or both.

It is contemplated that the operation and functions of the invention have become fully apparent from the foregoing description of elements, but for completeness of disclosure, the usage of the invention will be briefly described.

Example 1

A coating drum as illustrated in FIGS. 1, 2 and 4 is used to place a coating of paper mill sludge on grass seed. Raw material grass seed about 4-6 millimeters long and about 0.5-1.0 millimeter thick, is continuously fed to pre-treater 11, where the seed is blended with powdered lime, powdered flyash, and a lignosulfonate binder, to form partially-developed seed capsules comprising seeds coated with relatively thinner coatings of the recited mixture of coating materials. The partially-developed seed capsules are continuously fed to inlet end 12 of drum 10, to form a bed 20 of the partially-developed seed capsules. The drum rotates continuously. The rolling of the drum, and the associated mixing affect of the flights, provide a constantly changing top surface of the bed. A paper mill sludge slurry is supplied in pipe 28 at pressure sufficient to atomize the liquid sludge slurry. A liquid sludge slurry is thus sprayed from nozzles 30 onto the top surface of the bed of partially-developed seed capsules, applying a sludge coating on those partially-developed seed capsules which are at the upper surface of the bed at any given point in time.

The resulting seed capsules, of paper mill sludge coated seeds, have a coating of soil conditioning sludge thick enough to make the material a product marketable for its soil conditioning content as well as for the seeds contained therein. Increased levels of nitrogen and/or other plant nutrients can be added by, without limitation, providing sprays of the other desired materials, preferably subsequent to at least the initial sludge slurry spray. Other materials can be included in one or more of the sprays e.g. to retard or enhance moisture permeation into or out of the combination product in accord with the anticipated storage and/or use environment of the product.

Example 2

Figure 5:
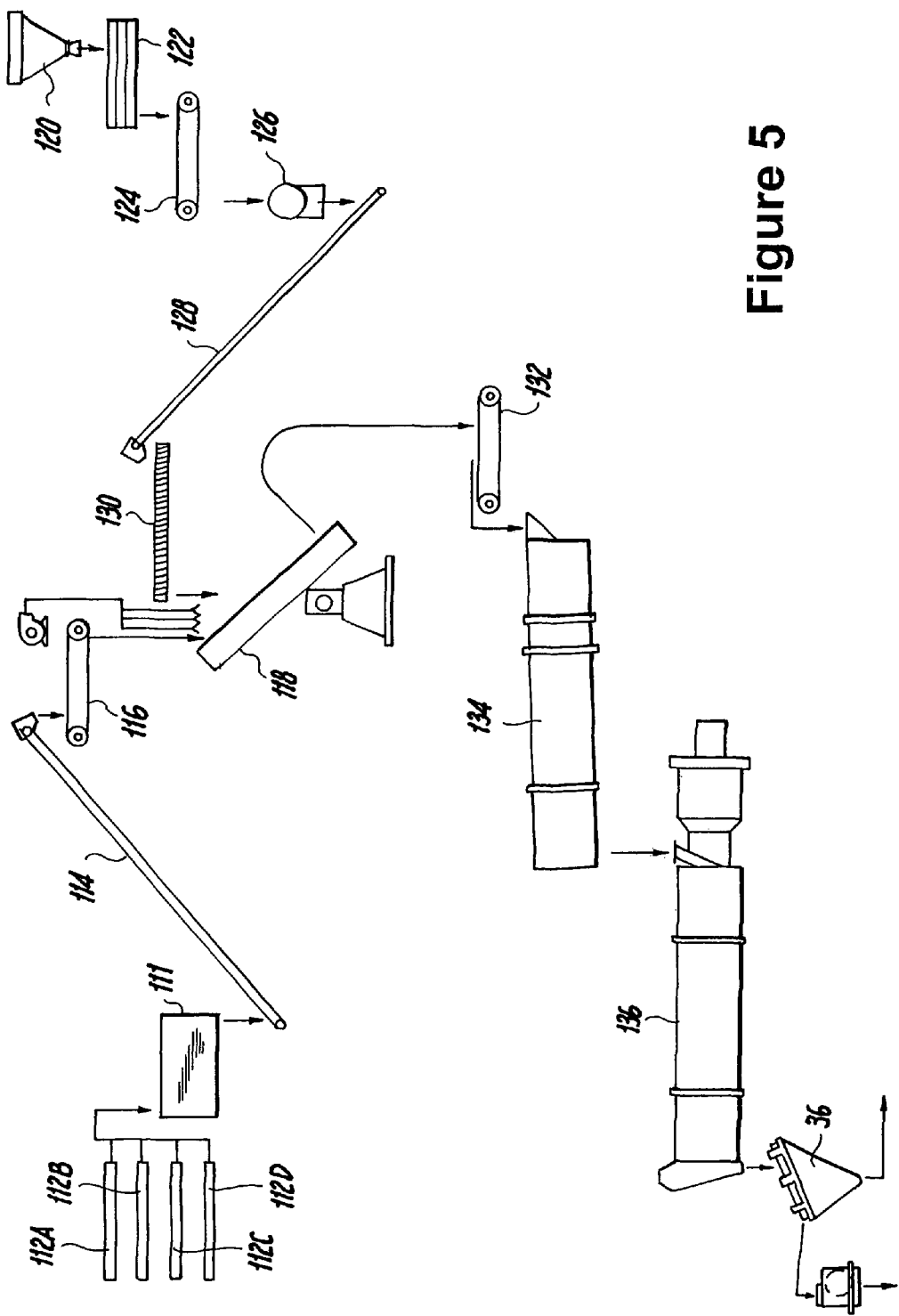
FIG. 5 is a schematic representative flow diagram illustrating a third manufacturing process for producing combination seed capsule product of the invention.

FIG. 5 illustrates the equipment used in this EXAMPLE 2. As seen therein, grass seed, lime, flyash, and calcium lignosulfonate binder are fed to ribbon blender 111 by respective screw feeders 112A, 112B, 112C, 112D respectively. Ribbon blender 111 encapsulates the seed with a thin layer of the mixture of lime, flyash, and lignosulfonate to thereby make partially-formed seed capsules. The partially-formed seed capsules are discharged from the ribbon blender and conveyed by conveyor 114 and belt feeder 116 to a tilted-pan pelletizer 118, which rotates about a fixed axis.

Paper mill sludge is received into a weigh hopper 120 at about 60% by weight water, and is fed by screw feeder 122 and belt 124 to pin mixer 126. The pin mixer breaks down the fiber and fiber clusters of the sludge into loose separate fibers, and discharges the resultant material onto conveyor 128 which transports the material to screw feeder 130, and thence into the tilted pan pelletizer.

In the titled pan pelletizer, the partially-formed seed capsules, (seeds being coated with lime, flyash, and lignosulfonate) are mixed with the comminuted paper mill sludge and thereby coated with the sludge. By operation of the tilted rotating pan pelletizer, the larger seed capsules generally rise to the top of the bed of seed capsules in the pan, and as additional material (sludge and partially-formed seed capsules) are added to the pan, the larger seed capsules overflow the lower edge of the rotating pan, onto vibrating feeder conveyor 132.

The vibrating feeder conveyor feeds the seed capsules into granulator 134 (e.g. rotating drum) where the seed capsules may be (e.g. spray) coated with inorganic fertilizer or other desired material.

From the granulator, the seed capsules flow into dryer 136 and are dried to a final product moisture of about 2-3% by weight water. The resultant product is then screened and sized as before, with undersized and oversized product seed capsules being recycled for further processing.

Urea and other liquid chemical fertilizers can, as indicated, be used as binders to bind together soil conditioning coatings which are not readily self-bonded together. In such embodiments, the urea or other liquid fertilizer composition serves as the binder or glue which holds together the soil conditioning material which is used as the coating. Other binding materials may be used either alone or in combination with the chemical fertilizer. Any plant nutrient components of the binder/glue composition contribute to the plant nutrient value, e.g. nitrogen, phosphorous, and/or potassium, provided by the so-made seed capsules. Thus, a binder/glue, or a multiplicity of binders/glues, properly selected as to nutrient value can provide, in the finished product, significant contribution to any desired fertility analysis.

A primary purpose of soil conditioning products is to condition the soil in terms of properties other than direct provision of plant nutrients.

The primary purpose of conventional inorganic chemical fertilizer products is to directly provide plant nutrients. It is well known that highly purified forms of inorganic chemical materials are more concentrated than desired in close or intimate proximity with seed, in the growing medium. Thus, inorganic chemical fertilizers can be diluted in concentration and still have sufficient nutrient content to be highly useful additives in soil conditioning seed capsules of the invention. It is common practice to modify and thus dilute inorganic chemical fertilizer products with filler materials that do not provide plant nutrients, in order to provide less concentrated fertilizer products. To the inventor's knowledge, such diluents, however, do not include soil conditioning products, especially not organic soil conditioning products.

It is conventionally known to apply commercially available soil conditioning materials and inorganic fertilizers, in separate applications, to a given common plot of soil to assist the soil in growing a crop. For example, it is known to make a first broadcast or other placement of lime to control pH of the soil, followed by a second broadcast and/or row-applied placement of granular inorganic chemical fertilizer. It is also known to make sequential applications of a soil conditioning material such as fresh or aged manure followed by inorganic fertilizer, all of which may be separate from the step of applying seed. And where seed is indeed applied in the same step, the seed and soil conditioner are not intimately bound in controlled positioning with respect to each other in common in individual particles of the product so applied, as in the invention.

To the inventor's knowledge, it is not known to apply soil conditioning material and inorganic chemical fertilizer in a common carrier/particle. Nor is it known to apply seed in a seed capsule wherein the seed is intimately combined with a soil conditioning material in a common particle, optionally with an inorganic fertilizer component in controlled positioning with respect to the seed in the same capsule as a seed-soil conditioning particle.

In those embodiments of the invention comprehending both soil conditioning and inorganic fertilizer in the same seed capsule/particle, the ratio of soil conditioning material to inorganic chemical fertilizer material can vary, from, for example, about 80% by weight up to less than 100% by weight soil conditioning material, with corresponding greater than 0% up to about 20% by weight inorganic chemical fertilizer. Generally, the invention as practically applied, however, is somewhat more narrowly defined, because the practical benefits of the invention are achieved at more balanced combinations of the soil conditioning material and the inorganic chemical fertilizer.

Thus, a preferred amount of soil conditioning material is about 90% by weight to about 98% by weight soil conditioning material, in combination with about 2% by weight to about 10% by weight inorganic chemical fertilizer. To the extent the soil conditioning material is present in amount less than about 80% by weight, the corresponding 20% by weight organic fertilizer in such close and intimate proximity to the seed may be toxic to the seed. To the extent the inorganic fertilizer is present in an amount of less than 2% by weight, the beneficial fertility affects of the fertilizer may not be perceived.

Figure 6A:
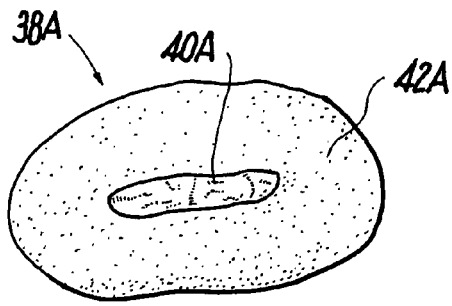
FIGS. 6A, 6B, 6C, and 6D show cross sections of seed capsules of the invention.

To the extent the inorganic fertilizer can be confined in a layer displaced from the seed, a higher level of inorganic fertilizer may be used while limiting risk of a toxic response from the seed. Referring now to FIGS. 6A-6D, in the embodiment of FIG. 6A, seed capsule 38A comprises a seed 40A coated with a single generally homogeneous coating 42A. Coating 42A, as illustrated in FIG. 6A, may comprise only the soil conditioning material (e.g. paper mill sludge or sewage sludge), or may comprise both the soil conditioning material and an inorganic fertilizer or other inorganic material generally dispersed in coating 42A.

Figure 6B:
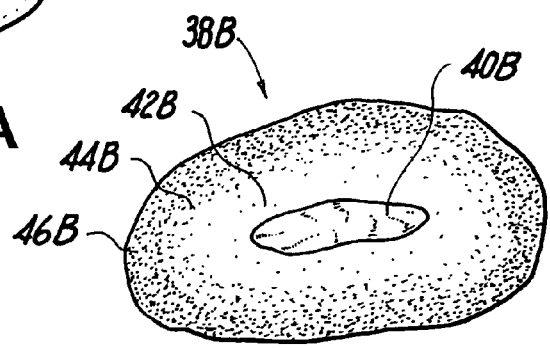

In FIG. 6B, seed capsule 38B comprises a seed 40B coated with a first layer 42B of soil conditioning material. A second coating material is shown penetrated part-way through the first layer 42B, thus to make a combination outer layer 44B comprising the combination of the material of layer 42A and the material of the second material, such as inorganic fertilizer.

Figure 6C:
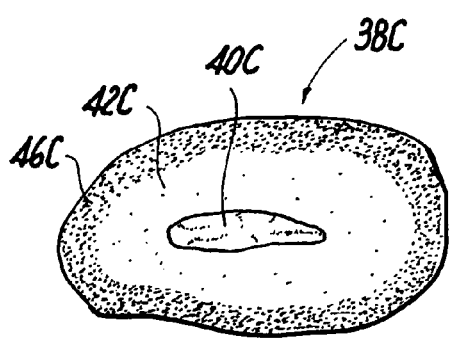

In FIG. 6C, seed capsule 38C comprises a seed 40C coated with a first layer 42C of soil conditioning material. A second generally separate and distinct layer 46C of a second coating material (e.g. inorganic fertilizer) is disposed outwardly on the underlying first layer 42C. Layer 46C generally does not penetrate layer 42C, whereby higher levels of inorganic fertilizer may be used because of the effective displacement distance between the seed and the second layer 46C. The second layer may be prevented from penetrating the first layer by applying e.g. an intervening layer which repels the second layer, for example was, lignin, or the like.

Figure 6D:
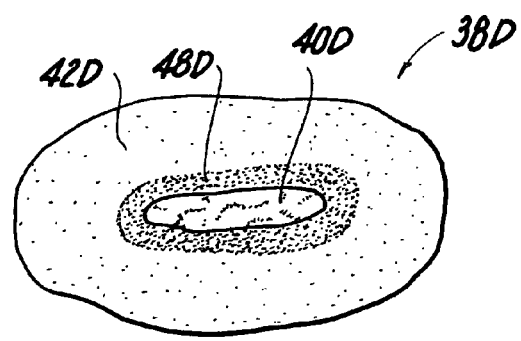

In FIG. 6D, seed capsule 38D comprises a seed 40D coated with a pre-coating layer 48D of dicalcium phosphate to densify and configure the seed capsule precursor for the primary coating steps in drum 10 or pan pellitizer 118. Layer 42D of soil conditioning material is disposed outwardly of pre-coating layer 48D. Other materials such as at layers 44B or 46C can be added to any of the embodiments, including that of FIG. 6D to provide the properties associated therewith.

In alternative embodiments, seed capsules can comprise a seed coated with at least one heterogeneous layer. The heterogeneous layer comprises at least two different materials substantially commingled, uniformly or non-uniformly, within a single layer. Such materials can include, for example, soil conditioning material and inorganic fertilizer, nutrients, herbicides, fungicides, binders and/or any other layer material contemplated by the present invention.

While the soil conditioning material/sewage sludge or paper mill sludge may contain a nominal amount of nitrogen and lesser quantities of phosphorous, potassium, and micronutrients, these small levels of plant nutrient content are generally not high enough for the plant nutrients to be considered a primary commercial asset. Yet only small nutrient amounts are desired so close to the seed. Thus, in some, the nutrient content of the sludge may be fully acceptable as the sole coating material on the seed in making suitable and acceptable seed capsules of the invention.

Products of the invention offer a new combination of properties, namely readily available excellent soil conditioning properties in combination with the seed in a seed capsule wherein size and density of the seed capsule are controlled to the desired size and weight.

One of the properties offered by soil texture conditioners such as sewage sludge and paper mil sludge is that of maintaining soil condition by retaining moisture in the soil, retarding leaching of soil nutrients from the root zone, and attenuating hardening, clumping, or other hard agglomeration characteristics of the soil, which harder soils are more difficult for plant roots to penetrate than are softer soils. Thus, improving the soil texture condition, soil tilth, increases the efficiency with which plant nutrients are retained and used for plant nutrition, as well as generally improving the environment of the soil to accommodate, and readily receive, root growth.

When soil conditioning materials and plant nutrients are applied separately to the soil, as in the prior art, the ratio of applied plant nutrients to applied soil conditioning material typically varies widely according to variations in the uniformity of the two applications of the two materials. Further, the soil conditioning material is generally not closely associated with the plant nutrient-containing fertilizer in the soil, and certainly neither soil conditioner nor the fertilizer are controllably-closely associated with the seed, such that nutrient absorption benefits provided by the soil conditioning material are not assuredly associated with respective particles of inorganic chemical fertilizer materials, and neither the soil conditioning material nor the inorganic fertilizer is controllably and intimately associated with the seed as in a common capsule or other particle as in the invention.

Rather, where soil conditioning and fertilizer materials are applied in separate applications and/or in applications separate from the application of the seed, the bulk of the soil conditioning material and the bulk of the inorganic chemical fertilizer are generally at least somewhat separated from each other in space, and physically separated from the seeds, such that potential cooperative benefit of the soil conditioning material as relates to solvation and up-take of soil moisture and/or of the inorganic chemical fertilizer by the seed are not obtained, and/or are not obtained in controlled close association with the seed.

When the soil conditioning material, the inorganic chemical fertilizer materials, and the seed are separately applied to soil with different sets of equipment, the respective rates of application vary such that the desired ratios between the quantities of the several materials are applied somewhat non-uniformly. The variances from uniformity will be different for each of the applications, thus adversely skewing the relative ratios of the materials with respect to each other at different locations in the e.g. field. Further, when applied separately to the soil, the seed and the soil conditioner are not necessarily in intimate contact with each other as they are when both materials are combined into a single combined seed capsule product as in the invention. Nor is the seed in closely controlled proximity (e.g. within the same capsule) with the inorganic fertilizer. In reality, then, any fertilizer added to the soil but not in close proximity to the seed applied to the same soil during e.g. the same growing season, is of reduced value is realized, during that growing season, from the application of such material to the soil.

The amounts of soil conditioning material and inorganic fertilizer added to the soil at any given time represent a small fraction of the "soil" in the plant growing zone (root zone). Thus, in the conventional practice of providing separate applications of plant nutrients and soil conditioning material, in addition to the seed, only small fractions of the newly applied soil conditioning material and plant nutrient come into proximate cooperating relationship with each other and with the seed. Thus, the seed and any plant newly emergent from the seed are benefited only to the extent the overall average root zone of the soil is benefited by the applied soil conditioning material.

Even were combinations of soil conditioner, inorganic chemical fertilizer, and seed are to be applied as separate and distinct physical product particles, using a single application apparatus and a single application process, the individual particles of soil conditioner, individual particles of inorganic chemical fertilizer, and individual particles of seed would be separated from each other to a significant degree, during the application process, such that the benefits of intimate association with each other in the soil would be lost. Indeed, the seed benefits from intimate contact with a substantial quantity of soil conditioner, but can tolerate intimate contact with only limited concentrations of fertilizer chemicals. Rather, fertilizer chemicals should in general be displaced from, but controllably located close to the seed.

In an uncontrolled application of fertilizer by an application separate from application of the seed, as in the prior art, some of the seed might be expected to be placed so close to some of the inorganic fertilizer as to be damaged by the toxic affect of such close association. Thus, the benefit of intimate contact between organic soil conditioning material, inorganic chemical fertilizer, and seed, is reduced and largely lost because of low levels of intimate association between the soil conditioning material and the seed, and unpredictable, uncontrolled levels of association between the seed and the inorganic chemical fertilizer, outside the combination of the invention, of soil conditioning coating of the seed, and optional addition of inorganic fertilizer at controlled location with respect to the seed, all in the same seed capsule, as taught herein.

By combining an organic soil conditioning material in the same seed capsule with the seed, highly effective levels of soil conditioner are assuredly associated with the seed as the seed germinates and begins to grow. Where suitable levels of plant nutrient fertilizer are incorporated into the same seed capsule, growth of the newly germinated plant is further enhanced. In either case, the soil conditioning materials can and do tend to retain moisture and nutrients in the soil in the defined area of the seed capsule by a variety of mechanisms, providing an extended time period during which nutrients can be taken up by the plants. For example, organic soil conditioning material may retain moisture, reducing moisture drainage from the soil, such that the rate of leaching of the nutrients is, in general, reduced. Further, the soil conditioning material may absorb or otherwise physically or chemically attach to plant nutrient materials in the chemical fertilizer material, thus further retarding leaching of the plant nutrient away from the seed.

While applicant cannot place an exact time period on the increase in the extent to which the soil conditioning materials retard leaching of the plant nutrients from proximity with the seed, thereby holding the plant nutrients available for up-take by the plant, any increase in time during which the nutrients are held in the soil proximate the newly-emerging plant is beneficial to meeting the nutritional needs of the plant being so fed.

By incorporating soil conditioning materials and optionally plant nutrient fertilizers, in the seed capsules, the invention offers an efficiency of application of soil conditioning materials in proximity to the seeds most beneficially affected thereby, in a beneficial association never before available.

Optional addition of plant nutrients to the same seed capsule provides a largely self-contained microcosm of seed, soil conditioner, and inorganic fertilizer in intimate yet controlled spatial relationship with each other, whereby the controlled spacings provide enhanced plant growth benefit. Namely, soil conditioning materials and plant nutrients are somewhat beneficial to each other for the overall cooperative achievement of soil fertility in the presence of the newly emerging plant which is dependent on such plant nutrients, and on moisture retained by the soil conditioner for uptake of such plant nutrients.

While soil conditioning materials do perform a number of highly interdependent tasks, one such task is in assisting in maintaining the plant nutrients in the root zone where they can be effectively used by the plants when needed. Another such task is in assisting in making the soil soft and friable in the root zone whereby the newly-emerged and very tender plant roots more readily penetrate the soil as they grow.

Where both soil conditioner and fertilizer are incorporated with the seed into the seed capsule, the soil conditioner assists in strategically maintaining the combination of soil conditioner and plant nutrients in close and controlled proximity to each other and to the seed in the soil. Such strategic placement virtually assures that the soil conditioning material and inorganic chemical fertilizer are bound to each other, in proximate relationship with the seed, for a time, such that wherever the seed capsule may land when the seed is sown, the seed will have the initial benefit of both soil conditioner and plant nutrients in intimate proximity with itself, irrespective of any condition of the surrounding growth medium. Thus, in the invention, soil conditioning material and optionally inorganic chemical fertilizer, are inherently bound to each other, and to the seed, as by the coating process, and inherently assist the seed in achieving desired germination and strong early growth.

By incorporating the soil conditioning material in the same seed capsule with the seed, the invention ensures that the seed has benefit of intimate relationship with a beneficial amount of soil conditioner material. The seed thus receives the advantage of the beneficial amount of soil conditioner material irrespective of the overall tilth of the soil and irrespective of the overall level soil conditioner, e.g. soil texture conditioner, in the root zone of the soil with which the seed capsule becomes associated for seed and plant growth purposes.

Figure 7:
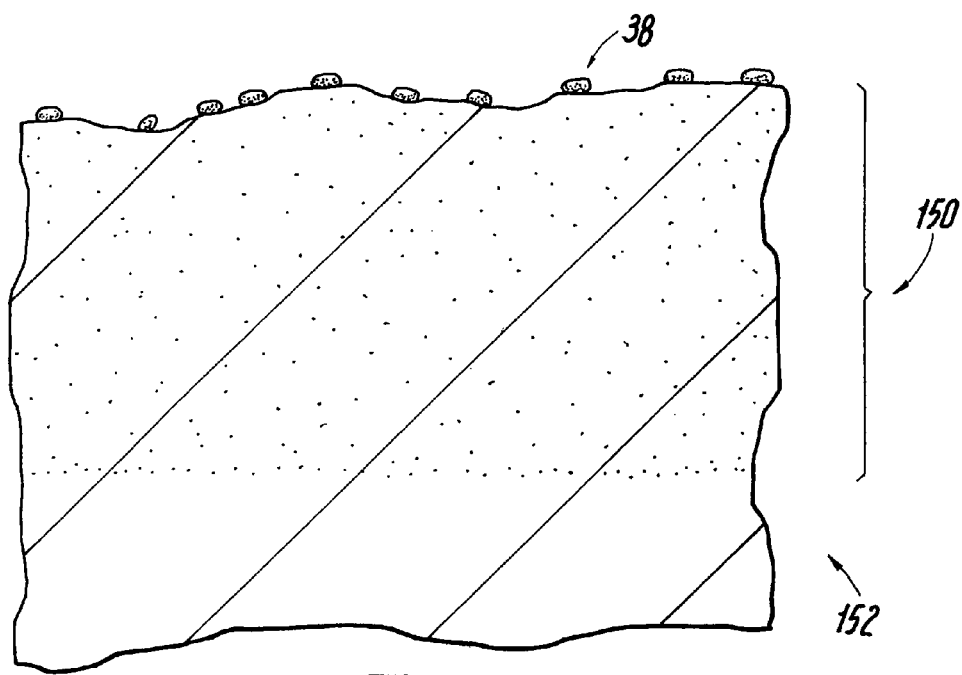
FIG. 7 illustrates a cross-section of the soil root zone, and a representative population of seed capsules at the top surface of the soil.

Referring to FIG. 7, a population of seed capsules 38 are disposed at the top surface of a cross section of soil. Root zone 150 of the soil is generally defined to that depth of the soil which typically receives roots of growing plants, and is generally defined within 20-30 inches of the top surface of the soil. Generally, and preferably, the root zone should have a soft texture, rich in organic and/or other soil conditioning material in order to provide good tilth, and desirable moisture and nutrient holding properties. Underlying root zone 150 is subsoil 152 which typically contains little organic matter.

It is a well known agricultural phenomenon that, in soil used for intensive crop production, the root zone tends, over time, to become relatively depleted of organic soil conditioning material, illustrated at 154 in FIG. 7, negatively affecting soil tilth and texture. While wholesale addition of organic soil conditioning material can improve the overall tilth of the soil, FIG. 7 illustrates application of the invention wherein the texture of the material immediately adjacent the seed, namely coating 42, provides beneficial properties attributes to soil having desirable texture.

Figure 8:
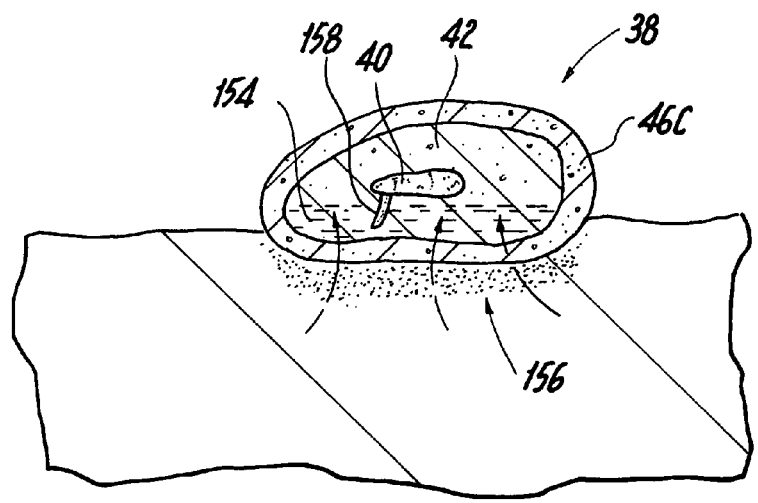
FIG. 8 illustrates a single seed capsule on the soil surface, and the micro-environment developing about the seed capsule.

FIG. 8 illustrates that coating 42 draws moisture 154 from the soil, into the capsule, where the moisture is available to assist in germination of seed 40. In the process, traverse of the moisture through second coating 46C releases plant nutrient material into the moisture, as well as downwardly into the soil adjacent the seed capsule, as illustrated at 156. Thus, the root 158 emerging from the seed emerges into an initial growth medium, coating 42, having texture, moisture, and plant nutrient highly advantageous to early plant growth. As root 158 advances further downward, the upper portion of the underlying soil under the capsule where the seed first enters the soil, has also been beneficially affected to the good of the plant by plant nutrients 156, and by moisture attracted or held in the vicinity of the capsule, as a result of the presence of the soil conditioning material in the capsule.

The relative amounts of the soil conditioning material and the inorganic chemical fertilizer material in the seed capsule vary significantly in accord with the specific application, and any specific interactivity desired of the soil conditioning material and inorganic chemical fertilizer. For example, in a particular combination of soil conditioning material and inorganic fertilizer a particular plant crop to be nourished by the product may require a higher amount of plant nutrient, or a specific analysis of plant nutrients, in order to be properly fed at and shortly after the stage of germination.

Thus, for a given specific application of combination seed capsule (with fertilizer) product of the invention, the relative amount of inorganic chemical fertilizer, and the fertilizer analysis, may be increased or decreased from some "standard" in the interest of achieving a functionally adequate feeding of the newly germinated seedlings. Namely, the NPK etc. nutrient levels provided in a given seed capsule product of the invention can be set and controlled at the fertilizer manufacturing plant in accord with the respective NPK etc. nutrient needs of the seed to be supported, or of the soil or other growth medium to which the combination fertilizer of the invention is to be applied.

In any embodiments, whether or not specifically discussed here, the fabricated seed capsules are kept sufficiently cool, and are kept sufficiently dry, to avoid the seed capsules sticking to each other, caking, and the like, and to prevent premature germination of the seed. Where liquid is used to obtain the coating material in liquid state, sufficient liquid is removed during or shortly after the coating step to avoid the seed capsules sticking to each other, or caking, or the like. Where the seed capsules are made by process other than the process described here, the details of the process will determine proper cooling, drying, or other steps to provide a finished, dry, solid seed capsule or like product. A dry such product generally has moisture content less than 10% by weight preferably less than 5% by weight, most preferably less than 3% by weight.

As suggested by the description hereinabove, the processes of the invention are generally carried out to make combination seed improvement products solely by using physical processes such as coating and drying. While some minor chemical reactions may inadvertently accompany such physical processes, the invention does not rely on any chemical reaction for achievement of the objectives thereof. Rather the invention is focused on a physical combination of starting materials, which physical combination results in mutual benefits of the two starting materials (seed and soil conditioner, and optional inorganic chemical fertilizer) functioning intimately together, in primarily physical and physico-chemical relationship, to produce an overall increase in benefits of plant germination and early plant growth with such combination seed improvement products.

The relative amounts of seed and coating material depend on the overall benefits desired to be achieved from the coating operations. In general, the seed will comprise from about 0.1% to about 75% of the overall weight of the seed capsule. The coating material thus represents about 25% to about 99.9% by weight of the seed capsule. Where the seed content is low, the general benefit of the product is that of soil conditioning, with some seed application. Such product is well suited for application to e.g. a healthy lawn for general improvement of soil condition, and modest fill-in of bare spots with seed.

Another benefit of low seed content by weight, especially with quite small seeds, is in creating a larger size seed capsule, and thereby facilitating the handling of such seed in commonly-used seed handling machines such as grain drills or seed broadcast machines.

Typically, however, a higher seed content is preferred so as to have major impact on the number of plants which are caused to germinate by application of such product. Thus, for a seed about 0.5-1.0 mm thick and about 4-7 mm long, a preferred fraction of seed is about 1% to about 50%, preferably about 1.5% to about 20%, more preferably about 2% to about 10% by weight seed, with respective amount of soil conditioner and optionally fertilizer. For example, in a preferred product of the invention, an above mentioned grass seed about 0.5-1.0 mm thick and about 4-7 mm long, when coated produces a seed capsule about 4 mm across and about 6-9 mm long. Smaller, or larger, seed capsules may be made and used as desired.

The size and density of the seed capsules can be readily controlled using conventional sizing equipment and processing parameters of the coating process, so as to provide a uniform product of a wide range of sizes and densities. With the size and density of any seed thus controllable, the size and density may be selected and specified for enhancing control and efficiency of seed handling and/or distribution. For example, tiny seeds such as lettuce, carrots, cabbage, and alfalfa, may be sized and weighted for easy and assured handling and distribution, whether by hand or by machine. Seeds which are non-aerodynamic, or which are so light as to be blown around, such as grass seed, can be made heavy and compact enough as to assuredly remain on location where sown after being planted. For example, non-aerodynamic seeds, after treatment according to the invention, can be broadcast-applied using conventional equipment such as is used to broadcast apply granular fertilizer over e.g. 40 foot wide application paths.

Where time controlled germination is desirable, a population of combination seed capsules, having at least one soil conditioner and one or more nutrients, can be planted in conjunction with non-coated seeds. As a result, non-coated seeds will germinate at an earlier stage than the population of combination seed capsules. Such staggering of germination times allows, for example, the non-coated seeds to use the available soil nutrients with less competition (i.e. less seeds using limited nutrient supply). At a later time, when the coated seeds germinate, such seeds can use the nutrients leached from their combination seed capsules to germinate.

Where e.g. small such seeds are desirably planted in close proximity with each other, and wherein a relatively larger size seed capsule is desired for ease of handling such that the large size seed capsule would potentially interfere with such close placement of the seeds with respect to each other, then and in such situation, multiple seeds may be employed in individual seed capsules, e.g. generally uniformly distributed throughout the seed capsule, so as to provide for sufficiently close spacing of the seeds from each other.

Paper mill sludge, as is suggested as a coating material herein, is a resultant by-product of papermaking, typically from e.g. a de-inking process in the paper mill.

By utilizing paper mill sludge and/or sewage sludge as taught herein, one contemplates beneficially and suitably disposing of significant quantities of industrial waste which otherwise is disposed of by landfilling.

Where the product of the invention is applied as to a residential or like lawn, as in an agricultural field, the seed is applied to the soil in intimate combination (seed capsule) with the soil conditioner, such that the soil conditioner serves as moisture retainer and sun shield. In addition, the seed capsule is much heavier and dense than the seed itself, whereby the seed capsule provides substantial protection against the seed being washed away in surface water run-off. Thus, the coating about the seed serves many of the functions typically performed by the conventionally-used straw mulch. Accordingly, product of the invention can be used to seed new lawns without any need for use of straw or any other mulch material.

Where seed is desirably used to fill in bare spots in the lawn, such seed, especially fertility-enhanced seed capsules, may be applied desirably in one of two ways. First, the coated seed capsule product may be applied only to perceived bare spots, without use of straw. The soil conditioner in the seed capsules serve the functions of the straw as described above, but perform better than straw because of the close association between the seed and the soil conditioner.

In the alternative, the coated seed capsule product may be broadcast generally over the entire lawn. Where the lawn is already healthy with thick grass growth, the soil conditioner and fertilizer will benefit the existing grasses, with minimal germination and growth of new seed from the seed capsules. Where the existing grass is thinner, the seeds in the seed capsules will have room and light to grow, whereby the combined properties of seed, soil conditioner, and fertilizer, in intimate relationship with one another, will be efficaciously used.

Where seed capsules of the invention are used to establish a new lawn, the soil conditioner in the seed capsules serve the functions of the straw as described above, obviating the need for straw in establishing the lawn seeding.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations.

To the extent the following claims use means plus function language, it is not meant to include there, or in the instant specification, anything not structurally equivalent to what is shown in the embodiments disclosed I the specification.

The invention claimed is:

1. A method of enhancing the control of moisture about a single grass seed to establish and improve seed beds comprising:

providing a coating composition surrounding a single grass seed in relative amounts to hold moisture about said grass seed, and provide immediate use of said moisture to assist in germination of said grass seed;

said coating composition comprising i) a binder, ii) a soil conditioning material consisting essentially of a particulate that holds moisture, and (iii) a further coating material consisting essentially of a particulate, said further coating material adds bulk, thickness, or any combination thereof, to said coating composition surrounding said grass seed;

said grass seed being a lawn grass seed;

agglomerating said grass seed and said coating composition into a seed product by an agglomeration process, said agglomeration process binds said soil conditioning material and said further coating material onto and surrounding said grass seed; said grass seed is a nucleating agent for said agglomeration process;

said soil conditioning material and said further coating material being in the form of (i) a dry particulate material, ii) a particulate material suspended in a liquid carrier, or iii) any combination thereof, during said agglomeration process;

building up one or more layers of coating composition onto said grass seed;

drying off moisture from said seed product to form an agglomerated seed product, wherein said coating composition is 25% to 99.9% by weight of said agglomerated seed product;

maintaining said coating composition generally disposed about said grass seed until said grass seed germinates;

said coating composition providing water holding properties about said grass seed to enhance the control of said moisture about said grass seed, said grass seed directly benefiting from said moisture held by said soil conditioning material, irrespective of the overall tilth of soil.

2. The method of claim 1 wherein said further coating material comprises lime, gypsum, calcium carbonate, or any combination thereof.

3. The method of claim 2 wherein said coating composition further comprises i) a fertilizer, ii) a fungicide, iii) a herbicide, or any combination thereof.

4. The method of claim 3 wherein said coating composition protects against deleterious effects of weather, animals, pests, the sun, weeds, spore-formers, worms, parasites, insects, larvae, or any combination thereof.

5. The method of claim 3 wherein said agglomeration process to form said agglomerated seed product occurs in a single agglomeration apparatus.

6. The method of claim 3 wherein said agglomerated seed product provides enhanced growing conditions compared to separate application of each of said soil conditioning material and said grass seed to soil.

7. The method of claim 3 wherein grass seed planting density for a desired plant population density is thereby reduced.

8. The method of claim 3 wherein said coating composition incubates said grass seed and provides a beneficial germination environment by binding to said grass seed to form a self-contained, value added said agglomerated seed product.

9. The method of claim 1 wherein said coating composition further comprises a fungicide, wherein said fungicide is a metalaxyl fungicide, Apron®, Subdue®, or any combination thereof.

10. The method of claim 1 wherein said coating composition further comprises a fertilizer, wherein said fertilizer comprising nitrogen, phosphorous, potassium, sulfur, manganese, copper, boron, iron, zinc, magnesium, chromium, monoammonium phosphate, diammonium phosphate, superphosphate, triple superphosphate, dicalcium phosphate, organic fertilizer, or any combination thereof.

11. The method of claim 10 wherein said fertilizer is applied to said grass seed at a controlled amount within said composition, and at a controlled distance from said grass seed within said coating composition.

* * * * *